United States Patent
Lee et al.

(10) Patent No.: US 8,265,643 B2
(45) Date of Patent: Sep. 11, 2012

(54) METHOD AND APPARATUS FOR AVOIDING COLLISION OF PREAMBLE IN BASE STATION

(75) Inventors: Chan Yong Lee, Daejeon (KR); Eun Seon Cho, Daejeon (KR); Hong Soog Kim, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 109 days.

(21) Appl. No.: 12/858,113

(22) Filed: Aug. 17, 2010

(65) Prior Publication Data

US 2011/0039567 A1 Feb. 17, 2011

(30) Foreign Application Priority Data

Aug. 17, 2009 (KR) .................. 10-2009-0075641

(51) Int. Cl.
 *H04W 72/04* (2009.01)
(52) U.S. Cl. .................... 455/450; 455/422.1
(58) Field of Classification Search .................. 370/252, 370/329, 342, 347, 335, 334, 203, 328, 229, 370/465; 455/450, 522, 510, 439, 452, 2, 455/69, 63.1, 422.1

See application file for complete search history.

(56) References Cited

U.S. PATENT DOCUMENTS

| | | | | |
|---|---|---|---|---|
| 6,405,048 B1 * | 6/2002 | Haartsen | ........................ | 455/464 |
| 6,944,426 B1 * | 9/2005 | Esser et al. | ...................... | 455/62 |
| 2003/0095520 A1 * | 5/2003 | Aalbers et al. | ................ | 370/338 |
| 2005/0148368 A1 * | 7/2005 | Scheinert et al. | .............. | 455/561 |
| 2009/0135761 A1 * | 5/2009 | Khandekar et al. | ............ | 370/328 |
| 2009/0156214 A1 * | 6/2009 | Lee et al. | ...................... | 455/436 |
| 2010/0226263 A1 * | 9/2010 | Chun et al. | .................... | 370/252 |
| 2011/0143743 A1 * | 6/2011 | Pollakowski et al. | ...... | 455/422.1 |

FOREIGN PATENT DOCUMENTS

| | | |
|---|---|---|
| KR | 1020090016402 | 2/2009 |
| KR | 1020090043434 | 5/2009 |

* cited by examiner

*Primary Examiner* — Jean Gelin
*Assistant Examiner* — Mahendra Patel
(74) *Attorney, Agent, or Firm* — Nelson Mullins Riley & Scarborough LLP; EuiHoon Lee, Esq.

(57) ABSTRACT

Provided is a method and apparatus for avoiding a collision of a preamble in a base station. When a new base station is installed in a mobile communication system and in this instance, an exclusive preamble using a contention-free scheme is employed to avoid a preamble collision, at least one of a code parameter, a time parameter, and a frequency parameter used in a preamble of the new base station may be set to be different from a code parameter, a time parameter, and a frequency parameter used in a preamble of a neighboring cell, whereby it is possible to manage a random access preamble without causing a collision between cells.

11 Claims, 3 Drawing Sheets

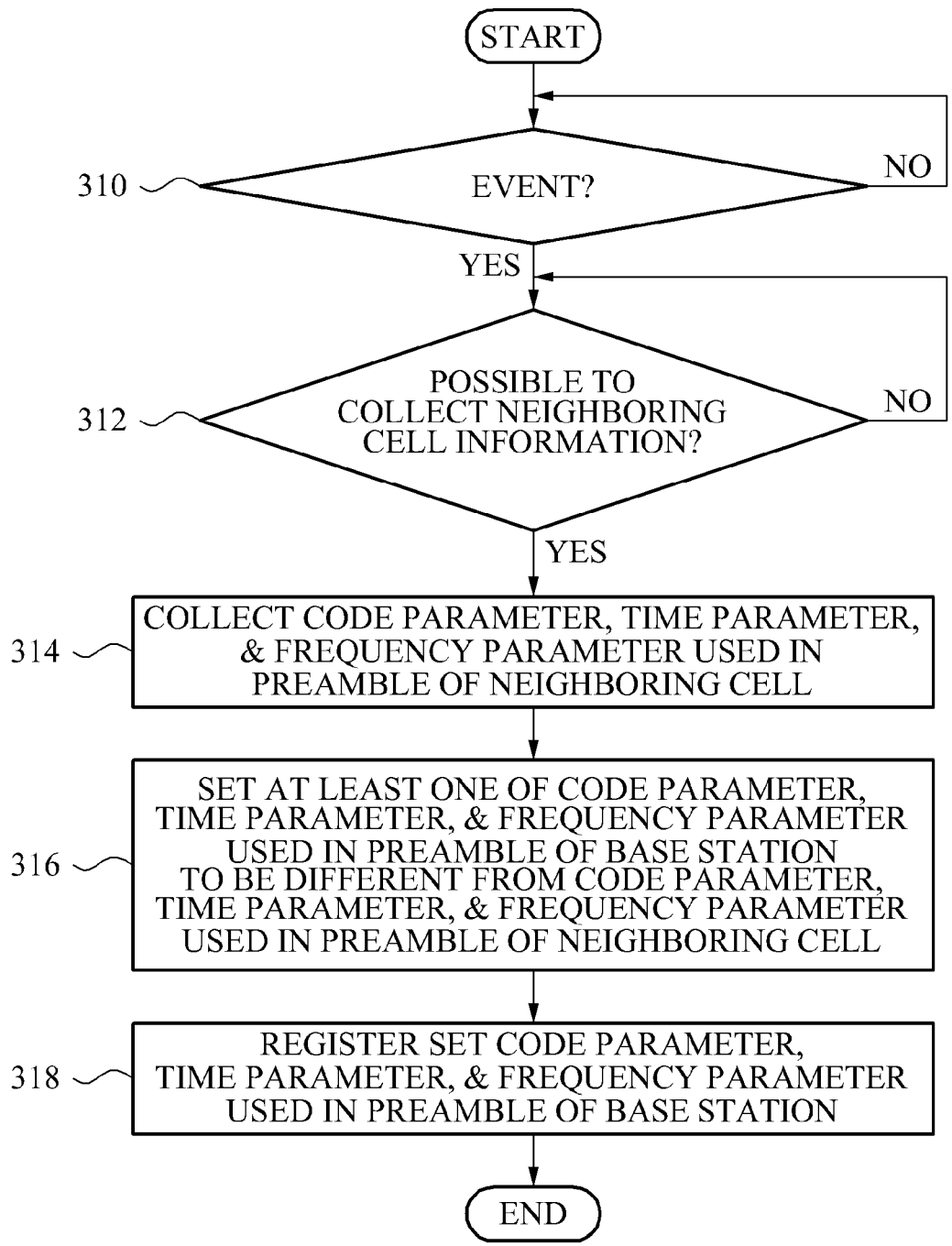

METHOD AND APPARATUS FOR AVOIDING COLLISION OF PREAMBLE IN BASE STATION

CROSS-REFERENCE TO RELATED APPLICATION

This application claims the benefit of Korean Patent Application No. 10-2009-0075641, filed on Aug. 17, 2009, in the Korean Intellectual Property Office, the disclosure of which is incorporated herein by reference.

BACKGROUND

1. Field of the Invention

Embodiments of the present invention relate to a method and apparatus for avoiding a collision of a preamble in a base station, and more particularly, to a method and apparatus for avoiding a collision that may construct a random access preamble, which is a signature that may automatically obtain an uplink synchronization and a radio resource in an initial stage or in an operation, when a new base station is installed in a mobile communication system, without causing a collision between cells.

2. Description of the Related Art

In a mobile communication system, in particular, in a $3^{rd}$ Generation Partnership Project (3GPP) Long Term Evolution (LTE) system, a terminal may generally perform a random access process for an access to a network. The terminal may perform the random access process to the network for initial access, handover, and the like.

The random access process may employ a contention scheme and a contention-free scheme. A difference between the contention scheme and the contention-free scheme lies in whether the terminal exclusively designates and uses a random access preamble. Specifically, in the case of the contention-free scheme, since a different preamble is used for a different terminal, a collision may not occur. In the case of the contention scheme, since the terminal uses a randomly selected preamble, at least two terminals may simultaneously use the same preamble and thus a collision may occur.

Even in the case of the contention-free scheme, when a large number of femtocells exist within a macro cell and a limited amount of preamble resources are used, a collision may occur due to the same code parameter, the time parameter, and the frequency parameter that are used between cells.

SUMMARY

An aspect of the present invention provides a method and apparatus for avoiding a collision of a preamble in a base station.

Another aspect of the present invention also provides a method and apparatus for avoiding a collision that may set a parameter used in a preamble of a newly installed or provided base station to be different from a parameter used in a preamble of a neighboring cell.

According to an aspect of the present invention, there is provided an apparatus for avoiding a collision of a preamble in a base station, the apparatus including: a neighboring cell identifier to collect neighboring cell information in order to determine whether a neighboring cell exists, and in order to identify the neighboring cell; a parameter collector to collect a code parameter, a time parameter, and a frequency parameter that are used in a preamble of the neighboring cell; and a parameter setting unit to set at least one of a code parameter, a time parameter, and a frequency parameter that are used in a preamble of the base station to be different from the code parameter, the time parameter, and the frequency parameter that are used in the preamble of the neighboring cell, when setting the code parameter, the time parameter, and the frequency parameter that are used in the preamble of the base station.

According to another aspect of the present invention, there is provided a method of avoiding a collision of a preamble in a base station, the method including: collecting neighboring cell information in order to determine whether a neighboring cell exists, and in order to identify the neighboring cell; collecting a code parameter, a time parameter, and a frequency parameter that are used in a preamble of the neighboring cell; and setting at least one of a code parameter, a time parameter, and a frequency parameter that are used in a preamble of the base station to be different from at the code parameter, the time parameter, and the frequency parameter that are used in the parameter of the neighboring cell, when setting the code parameter, the time parameter, and the frequency parameter that are used in the preamble of the base station.

Effect

According to embodiments of the present invention, when installing a new base station in a mobile communication system, an exclusive preamble may be employed using a contention-free scheme in order to avoid a preamble collision. By setting a code parameter, a time parameter, and a frequency parameter to be different between cells, it may be possible to avoid the preamble collision.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 3 is a flowchart illustrating a process of avoiding a collision of a preamble in a base station according to an embodiment of the present invention.

DETAILED DESCRIPTION

Figure 1:
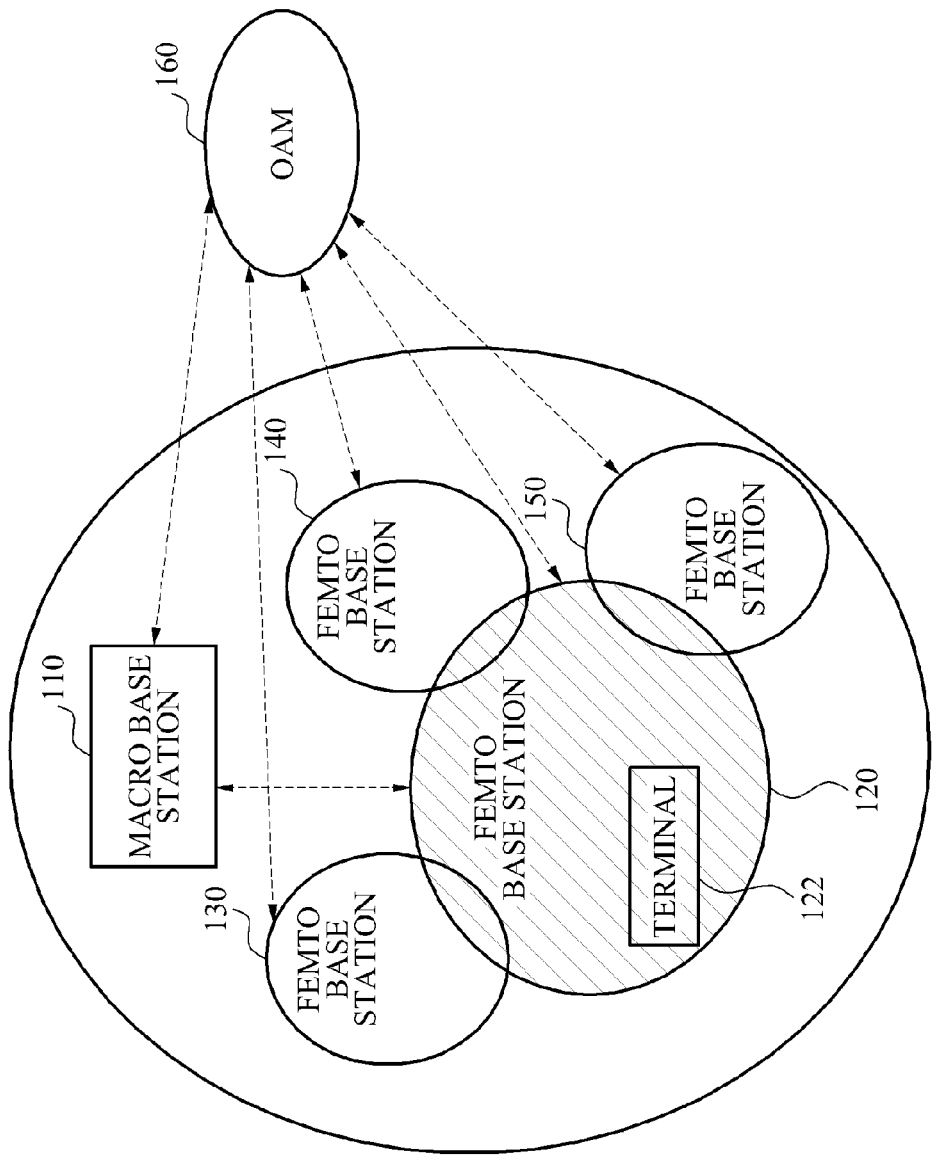
FIG. 1 is a diagram illustrating a configuration of a mobile communication system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described in detail with reference to the accompanying drawings. When it is determined detailed description related to a known function or configuration may render the purpose of the present invention unnecessarily ambiguous in describing the present invention, the detailed description will be omitted herein.

According to an embodiment of the present invention, there is provided a method and apparatus for avoiding a collision that may set a parameter used in a preamble of a newly installed or provided base station to be different from a parameter used in a preamble of a neighboring cell.

FIG. 1 is a diagram illustrating a configuration of a mobile communication system according to an embodiment of the present invention. A relationship between a newly installed base station and peripheral devices to avoid a preamble collision can be seen from FIG. 1. Referring to FIG. 1, a newly installed or provided femto base station 120 may collect neighboring cell information from a terminal 122 within a cell coverage of the femto base station 120 or a peripheral device, for example, a macro base station 110, and femto base stations 130, 140, and 150.

The newly installed or provided femto base station 120 may collect the neighboring cell information using a particular interface with the peripheral device. Also, the newly installed or provided femto base station 120 may receive a system information block from the femto base stations 130, 140, and 150 managing the neighboring cell, to thereby collect the neighboring cell information. The femto base station 120 may identify the neighboring cell based on the neighboring cell information.

The newly installed or provided femto base station 120 may collect, from an Operation, Administration, Maintenance (OAM) 160, a code parameter, a time parameter, and a frequency parameter that are used in a preamble of the neighboring cell, and then allocate a random access preamble to prevent a preamble collision.

Although the OAM 160 is described herein as a device managing the code parameter, the time parameter, and the frequency parameter used in the preamble of the neighboring cell, the present invention is not limited thereto. Specifically, any device managing parameters may be applicable.

Figure 2:
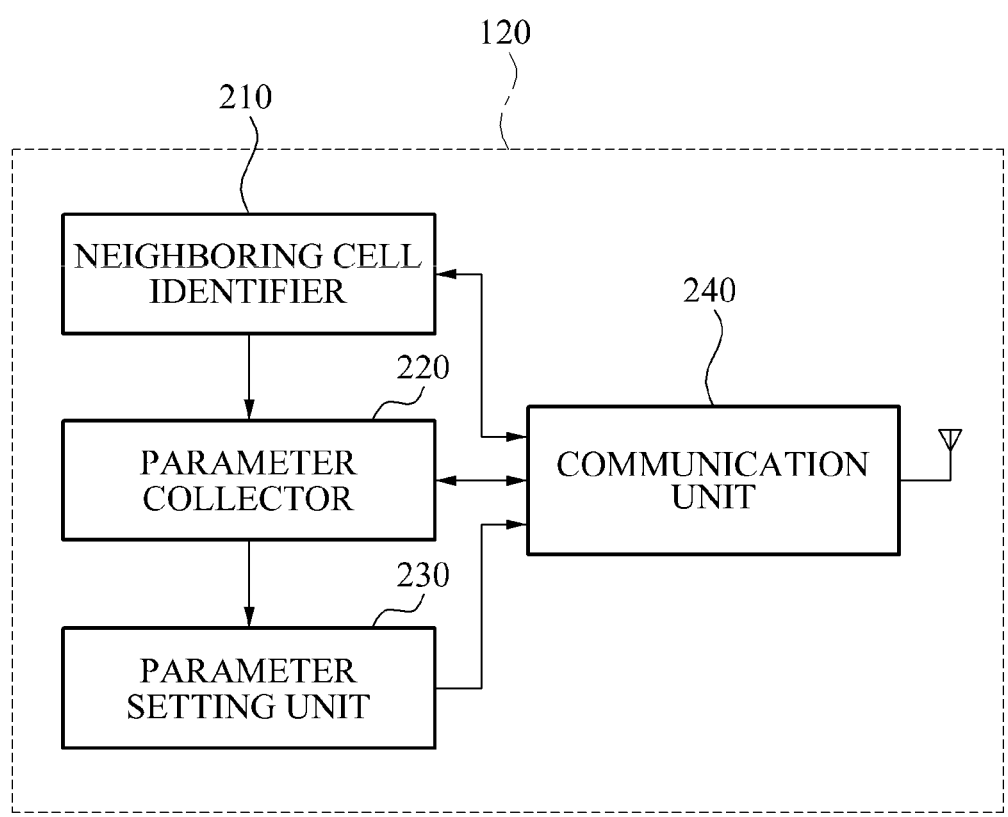
FIG. 2 is a block diagram illustrating a configuration of an apparatus for avoiding a collision of a preamble in a base station according to an embodiment of the present invention.

FIG. 2 is a block diagram illustrating a configuration of an apparatus for avoiding a collision of a preamble in a base station according to an embodiment of the present invention. Referring to FIG. 2, the femto base station 120 may include a neighboring cell identifier 210, a parameter collector 220, a parameter setting unit 230, and a communication unit 240.

The neighboring cell identifier 210 may collect neighboring cell information in order to verify whether a neighboring cell exists, and in order to identify the neighboring cell. The neighboring cell identifier 210 may collect the neighboring cell information from a terminal within a cell coverage of the femto base station 120 or a peripheral device, for example, a macro base station and a femto base station via a particular interface. Also, the neighboring cell identifier may receive a system information block from the terminal within the cell coverage or the peripheral device, to thereby obtain the neighboring cell information from the system information block.

The parameter collector 220 may collect, from the OAM 160 or the peripheral device, a code parameter, a time parameter, and a frequency parameter that are used in a preamble of the neighboring cell, using the neighboring cell information.

When setting a code parameter, a time parameter, and a frequency parameter that are used in a preamble of the femto base station 120, the parameter setting unit 230 may set at least one of the code parameter, the time parameter, and the frequency parameter used in the preamble of the femto base station 120 to be different from the code parameter, the time parameter, and the frequency parameter that are used in the neighboring cell. By setting the at least one parameter used in the femto base station 120 to be different from the neighboring cell, a preamble collision may be prevented.

The communication unit 240 may provide a communication with the terminal within the cell coverage of the base station 120, a neighboring base station, the OAM, and a parameter administration maintenance unit (not illustrated).

The communication unit 240 may receive the neighboring cell information from the terminal within the cell coverage and the peripheral device. The communication unit 240 may receive, from the OAM 160 or the parameter administration maintenance, the code parameter, the time parameter, and the frequency parameter that are used in the preamble of the neighboring cell. The communication unit 240 may transmit the set code parameter, the time parameter, and the frequency parameter to the OAM or the parameter administration maintenance.

Hereinafter, a method of avoiding a collision of a preamble in a base station will be described.

FIG. 3 is a flowchart illustrating a process of avoiding a collision of a preamble in a base station according to an embodiment of the present invention.

Referring to FIG. 3, when the base station detects an occurrence of an event constituting the preamble in operation 310, and the base station may collect neighboring cell information in operation 312, the base station may collect neighboring cell information to verify whether a neighboring cell exists, and to identify the neighboring cell.

The base station may collect the neighboring cell information from a terminal within a cell coverage of the base station or a neighboring device via a particular interface. Also, the base station may obtain the neighboring cell information from a system information block received from the terminal within the cell coverage or the peripheral device.

In operation 314, the base station may collect a code parameter, a time parameter, and a frequency parameter that are used in a preamble of the neighboring cell, from an OAM or a parameter administration maintenance using the collected neighboring cell information.

In operation 316, the base station may set at least one of a code parameter, a time parameter, and a frequency parameter that are used in a preamble of the base station to be different from the code parameter, the time parameter, and the frequency parameter that are used in the preamble of the neighboring cell.

In operation 318, the base station may transmit, to the OAM or the parameter administration maintenance, the set code parameter, the time parameter, and the frequency parameter that are used in the preamble of the base station, and thereby register the set code parameter, the time parameter, and the frequency parameter.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments.

Instead, it would be appreciated by those skilled in the art that changes may be made to these exemplary embodiments without departing from the principles and spirit of the invention, the scope of which is defined by the claims and their equivalents.

What is claimed is:

1. An apparatus for avoiding a collision of a preamble in a network, the apparatus comprising:
    a neighboring cell identifier to collect neighboring cell information in order to determine whether a neighboring cell exists, and in order to identify the neighboring cell, wherein the neighboring cell identifier receives the neighboring cell information from a terminal within a cell coverage of a corresponding base station or a peripheral device;
    a parameter collector to collect a code parameter, a time parameter, and a frequency parameter that are used in a preamble of the neighboring cell; and
    a parameter setting unit to set at least one of a code parameter, a time parameter, and a frequency parameter that are used in a preamble of the base station to be different from the code parameter, the time parameter, and the frequency parameter that are used in the preamble of the neighboring cell, when setting the code parameter, the time parameter, and the frequency parameter that are used in the preamble of the base station,
    wherein a parameter setting process is performed for a newly installed base station so that the code parameter, the time parameter, and the frequency parameter used in the preamble of the newly installed base station are set to be different than the code parameter, the time parameter, and the frequency parameter used in the preamble of a neighboring cell,
    wherein the parameter collector requests the code parameter, the time parameter, and the frequency parameter that are used in the preamble of the neighboring cell, to a parameter administration controller based on the neighboring cell information, and receives, from the parameter administration controller, the code parameter, the time parameter, and the frequency parameter that are used in the preamble of the neighboring cell.

2. The apparatus of claim 1, wherein the neighboring cell identifier receives the neighboring cell information via a particular interface.

3. The apparatus of claim 1, wherein the neighboring cell identifier collects the neighboring cell information using a system information block received from a terminal within a cell coverage or a peripheral device.

4. The apparatus of claim 2, wherein the peripheral device includes an upper macro base station, a neighboring femto base station, or a neighboring pico base station.

5. The apparatus of claim 1, wherein the parameter setting unit transmits, to an OAM or a parameter administration maintenance, the set code parameter, the time parameter, and the frequency parameter that are used in the preamble of the base station, and thereby registers the set code parameter, the time parameter, and the frequency parameter.

6. A method of avoiding a collision of a preamble in a network, performed by a controller of a base station, the method comprising:
    collecting neighboring cell information in order to determine whether a neighboring cell exists, and in order to identify the neighboring cell;
    collecting a code parameter, a time parameter, and a frequency parameter that are used in a preamble of the neighboring cell; and
    setting at least one of a code parameter, a time parameter, and a frequency parameter that are used in a preamble of the base station to be different from at the code parameter, the time parameter, and the frequency parameter that are used in the parameter of the neighboring cell, when setting the code parameter, the time parameter, and the frequency parameter that are used in the preamble of the base station,
    wherein a parameter setting process is performed for a newly installed base station so that the code parameter, the time parameter, and the frequency parameter used in the preamble of the newly installed base station are set to be different than the code parameter, the time parameter, and the frequency parameter used in the preamble of a neighboring cell,
    wherein the collecting of the code parameter, the time parameter, and the frequency parameter comprises requesting the code parameter, the time parameter, and the frequency parameter that are used in the preamble of the neighboring cell, to a parameter administration controller based on the neighboring cell information, and receiving, from the parameter administration controller the code parameter, the time parameter, and the frequency parameter that are used in the preamble of the neighboring cell.

7. The method of claim 6, wherein the collecting of the neighboring cell information comprises receiving the neighboring cell information from a terminal within a cell coverage or a peripheral device via a particular interface.

8. The method of claim 6, wherein the collecting of the neighboring cell information comprises collecting the neighboring cell information using a system information block received from a terminal within a cell coverage or a peripheral device.

9. The method of claim 7, wherein the peripheral device includes an upper macro base station, a neighboring femto base station, or a neighboring pico base station.

10. The method of claim 6, wherein the collecting of the code parameter, the time parameter, and the frequency parameter comprises:
    requesting an OAM or a parameter administration maintenance for the code parameter, the time parameter, and the frequency parameter that are used in the preamble of the neighboring cell, based on the neighboring cell information; and
    receiving, from the OAM or the parameter administration maintenance, the code parameter, the time parameter, and the frequency parameter that are used in the preamble of the neighboring cell.

11. The method of claim 6, wherein the setting comprises transmitting, to an OAM or a parameter administration maintenance, the set code parameter, the time parameter, and the frequency parameter that are used in the preamble of the base station to thereby register the set code parameter, the time parameter, and the frequency parameter.

* * * * *